United States Patent [19]

Hattori

[11] Patent Number: 4,637,739
[45] Date of Patent: Jan. 20, 1987

[54] LINEAR GUIDE DEVICE

[75] Inventor: Masaru Hattori, Maebashi, Japan

[73] Assignee: Nippon Seiko Kabushiki Kaisha, Tokyo, Japan

[21] Appl. No.: 792,588

[22] Filed: Oct. 29, 1985

[30] Foreign Application Priority Data

Nov. 10, 1984 [JP] Japan .............................. 59-169819[U]

[51] Int. Cl.⁴ ............................................. F16C 29/06
[52] U.S. Cl. ..................................................... 384/45
[58] Field of Search ............... 308/6 C, 6 R; 384/469, 384/527, 45; 464/168

[56] References Cited

U.S. PATENT DOCUMENTS

| 3,027,626 | 4/1962 | Murphy | 384/527 |
| 4,432,587 | 2/1984 | Bryan | 308/6 C |
| 4,552,416 | 11/1985 | Lehmann et al. | 308/6 C |
| 4,555,149 | 11/1985 | Teramachi | 308/6 C |

Primary Examiner—Lenard A. Footland
Attorney, Agent, or Firm—Shapiro and Shapiro

[57] ABSTRACT

A linear guide device comprises an elongated rail, a slider rectilinearly slidable on the rail, circulation paths each including a rolling path formed between the rail and the slider and a return path formed in the slider, a part of the return path being formed by open grooves and closure members covering the grooves, and a number of balls inserted in the circulation path and rolling during the movement of the slider to thereby smoothen the movement of the slider.

4 Claims, 2 Drawing Figures

LINEAR GUIDE DEVICE

BACKGROUND OF THE INVENTION

1. Field of the Invention

This invention relates to a linear guide device, and in particular to a linear guide device in which the working of ball return holes and the assembly of the entire device have become easy.

2. Description of the Prior Art

A linear guide device includes an axially extending rail and a saddle-shaped (C-shaped) bearing movably mounted thereon through a number of balls. As the bearing moves on the rail, the balls roll in a ball rolling grooves formed between the rail and the bearing oppositely and come to an end portion of the bearing. Therefore, usually, a pair of end caps for circulating (U-turning) the balls are attached to the opposite ends of the bearing and an axial hole for returning the balls U-turned by the end caps of the opposite end portion of the bearing is formed in each side of the bearing.

Said ball return hole has heretofore been formed by forming an elongated circular hole in the bearing body by the use of a drill. However, where the diameter of the hole is small, the drill is readily damaged and the working of the hole requires a long time and moreover, the holes is bent or otherwise deformed. All these lead to low working accuracy. Also, the balls must be inserted into this ball return hole through the openings at the opposite ends thereof, and this has means cumbersomeness of the incorporation of the balls.

In order to eliminate such inconveniences, the applicant has disclosed, in Japanese Utility Model Application No. 157023/1983, a technique of forming concave grooves in the opposite outer sides of the bearing, closing the concave grooves by closure members and thereby forming ball return holes.

According to this technique, however, screw members or the like are used to attach the closure members to the bearing body, and this has led to a problem that the operation of attaching the closure members, that is, the formation of the return hole, is cumbersome.

SUMMARY OF THE INVENTION

It is an object of the present invention to overcome the above-noted problem and to provide a linear guide device in which ball return holes are formed by concave grooves formed in the opposite sides of a bearing body and closure members closing the concave grooves.

It is another object of the present invention to provide a linear guide device in which the closure members can be simply and reliably attached to the bearing body.

In order to achieve the above objects, in the present invention, concave grooves are formed in the opposite outer sides of the bearing body lengthwisely thereof and the concave grooves are closed by a pair of closure members each having a length and width sufficient to close the concave grooves. In a preferred embodiment of the present invention, the end portions of the closure members are supported by end caps when the end caps are attached to the bearing body.

According to the present invention, in forming the ball return holes in the bearing body by the concave grooves and the closure member closing the concave grooves, the closing members are supported by the end caps when the end caps are attached to the bearing body and therefore, the mounting of the closing members becomes easy and reliable.

DESCRIPTION OF THE PREFERRED EMBODIMENT

Figure 1:
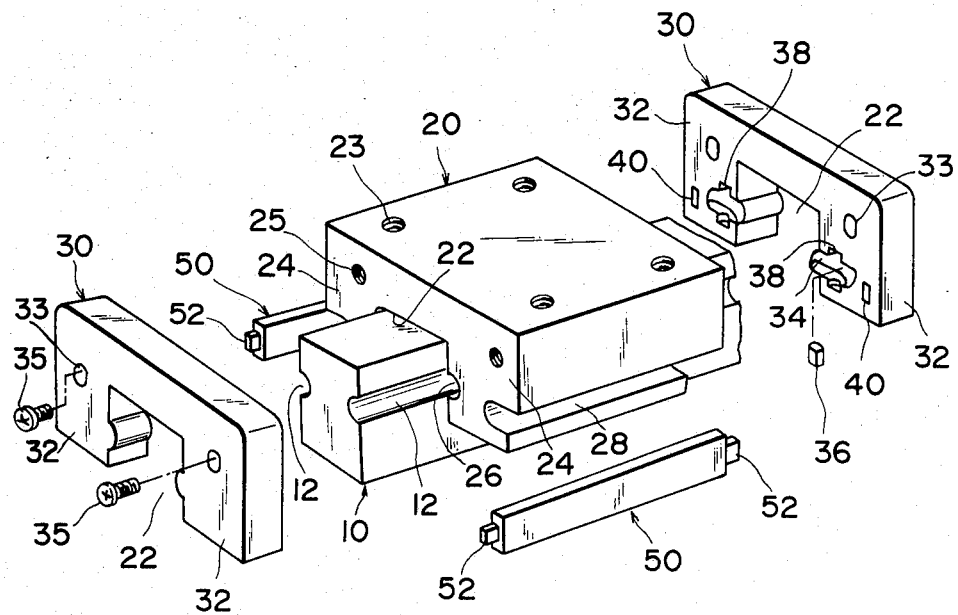
FIG. 1 is an exploded perspective view showing an embodiment of the present invention.
Figure 2:
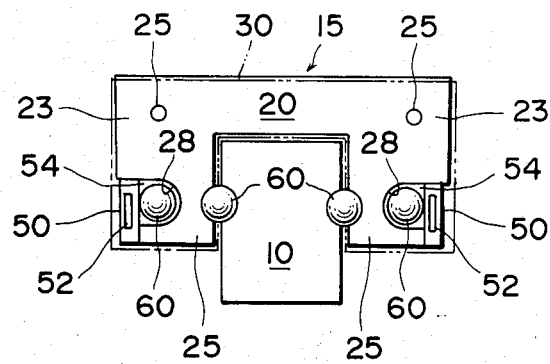
FIG. 2 is a front view showing the same embodiment with end caps omitted.

As shown in FIGS. 1 and 2, a rail 10 has a rectangular cross-section and extends long, and the opposite side surfaces thereof are each formed with a ball rolling grooves 12 extending lengthwisely of the rail. A bearing 15 comprises a body 20 and a pair of end caps 30 and is formed with a recess 22 in the central portion of the underside thereof and thus, it has a saddle-like shape. In the inner side surfaces of a pair of opposite sleeve portions 24 of the bearing, ball rolling grooves 26 (only one of which is shown) extending lengthwisely of the bearing are formed opposed relationship with said ball rolling grooves 12. The outer side surfaces of the body 20 are stepped in the intermediate portions thereof in the direction of height, and upper halves 23 project more sideways than lower halves 25. In the upper portion of the lower halves 25, open concave grooves 28 of semicircular cross-section (only one of which is shown ) are formed lengthwisely of and over the full length of the lower halves. Threaded holes 23 for bolts for mounting the bearing 15 on a moving table, not shown, are formed in the upper surface of the body 20, and threaded holes 25 for bolts for mounting the end caps 30 are formed in the end surfaces of the body 20.

The end caps 30 are formed of synthetic resin and have a shape similar to the shape of the main body 20 (saddle-like shape) of the bearing. A pair of semi-circular grooves 34 of a predetermined width are laterally formed in a pair of sides 32 of each end cap, and semicircular return guides 36 (only one of which is shown) are mounted in a direction perpendicular to the grooves 34 whereby ball circulation holes are defined. A pair of rectangular recesses 40 are formed outwardly of the grooves 34, and a pair of screw-receiving holes 33 are formed upwardly of the grooves 34. The caps 30 may be mounted to the body 20 by inserting screws 35 into the holes 33 and threadably engaging the screws 35 with the threaded holes 25.

A pair of closure members 50 are formed of a metal or synthetic resin and are of the same height as the lower halves 25 and of the same length as the body 20 so as to fully close said concave grooves 28. Rectangular projections 52 capable of being fitted into the recesses 40 of the end caps 30 are formed on the central portions of the opposite end surfaces of the closure members 50. By fitting the projections 52 into the recesses 40 when the end caps 30 are mounted to the body 20 with the concave grooves 28 of the body 20 being closed by the closure members 50, the closure members 50 are supported and ball return holes 54 are defined.

A number of balls 60 are inserted in the ball rolling grooves 12 and 26, the ball circulation holes of the end caps 30 and the ball return holes 54 of the main body 20.

In the linear guide device assembled as described above, when the bearing 15 moves on the rail 10 in either direction, the balls 60 in the ball rolling grooves 12 and 26 come to one end of the bearing 15 with the movement of the bearing 15, circulate in the ball circulation holes of the end caps 30 and move in the ball return holes 54 in the opposite direction.

In the present embodiment, the closure members 50 are mounted to the body 20 simultaneously with the mounting of the end caps 30 to the body 20. That is, the cumbersome operation of mounting the closure members to the main body by means of screw members as in the prior art becomes unnecessary. Moreover, since the linear guide device of the present invention is of the type in which the projections 52 are fitted into the recesses 40, the relative position between the closing members 50, the end caps 30 and the body 20 is primarily determined, and ball return holes 54 of a desired shape and desired dimensions can be formed easily. Particularly, if the closure members 50 are made of synthetic resin, the body 20 will become light in weight and inexpensive. The balls 60 are inserted into the concave grooves 28 from the outer sides thereof, whereafter the closure members 50 are attached to the outer sides of the concave grooves 28 by means of the end caps 30.

For example, apparatuses for manufacturing semiconductures or the like are used in a clean atmosphere and are required not to contaminate the atmosphere, and where the linear guide device of the present invention is utilized in these apparatuses, if the closure members 50 are formed of a plastic material, the balls 60 can be prevented from producing abrasion powder when they moves in the ball return holes 54 and thus, the clean atmosphere will not be contaminated. Further, if the closure members 50 are formed of an oil-containing plastic material impregnated with lubricating oil, it will be unnecessary to use grease which is used in the case of a metal and therefore, there will be no undesirable possibility that the atmosphere is contaminated by the vaporization of the grease. Suitable oil-containing plastic materials include oil-containing polyacetal, oil-containing polyamide, oil-containing polyester, etc.

The present invention should not be limited to the above-described embodiment, but suitable changes and improvements may of course be made within the scope of the invention. For example, the specific shape of the rail 10 and/or the bearing 15, the detailed structure of the concave grooves 28 and/or the closure members 50 and the manner of engagement between the closure members 50 and the end caps 30 may be arbitrarily chosen as required, and the end caps may be formed with projections and the closure members may be formed with recesses, or the end portions of the closure members may be directly fitted to or engaged with the end caps.

I claim:

1. A linear guide device comprising:
   a rail extending axially and having ball rolling grooves formed lengthwisely thereof in the opposite outer sides thereof; a bearing body of saddle-like shape mounted on said rail and having in the opposite inner sides thereof ball rolling grooves each being opposed to said each ball rolling groove and having in the opposite outer sides thereof open concave grooves formed lengthwisely thereof; closure members each having sufficient width and length to cover said each concave groove; a pair of end caps mounted on the opposite ends of said bearing body and supporting the opposite end portions of said closure members, ball return holes being formed by said concave grooves and said closure members, said end caps being formed with ball circulation holes connecting said ball rolling grooves to said ball return holes; and a number of balls inserted in said ball rolling grooves, said ball return holes and said ball circulation holes.

2. A linear guide device according to claim 1, wherein said closure members are of an elongated rectangular plate-like shape, projections are formed on the opposite end surfaces of said closure members, and recesses permitting said projections to be fitted thereinto are formed in the portions of said end caps which are opposed to said end surfaces of said closure members.

3. A linear guide device according to claim 2, wherein said closure members are formed of a plastic material.

4. A linear guide device according to claim 2, wherein said closure members are formed of an oil-containing plastic material impregnated with lubricating oil.

* * * * *